United States Patent Office 2,927,104
Patented Mar. 1, 1960

2,927,104

PREPARATION OF HIGH MOLECULAR WEIGHT POLYISOBUTYLENE

Augustus B. Small and John L. Ernst, Westfield, N.J., assignors to Esso Research and Engineering Company, a corporation of Delaware No Drawing. Application December 18, 1957
Serial No. 703,510

5 Claims. (Cl. 260—94.8)

The present invention relates to high molecular weight polyisobutylenes and more particularly it relates to the production of high molecular weight polyisobutylene by employing low catalyst concentrations.

It is well known to prepare polyisobutylene having a molecular weight from 80,000 to 300,000 Staudinger or higher by polymerizing isobutylene in the presence of solid metal halide catalysts such as aluminum chloride dissolved in a non-freezing, non-complex-forming solvent, such as methyl or ethyl chloride at a temperature below 0° C., preferably below $-40°$ C., or even as low as $-100$ to $-150°$ C. The actual molecular weight of the lower molecular weight polymers, e.g. 80,000 to 150,000 Staudinger is usually controlled by blending a molecular weight poison, such as diisobutylene, n-butenes, and the like with the feed in an amount adapted to give approximately the molecular weight desired.

It has now been found that high molecular weight polyisobutylene may be prepared in a simple and economical manner by employing a catalyst concentration below 0.01 weight percent.

According to the present invention, poison-free isobutylene is polymerized at temperatures below 0° C., preferably below $-40°$ C. and desirably at about $-100$ to $-150°$ C. The isobutylene is polymerized by contacting it at the desired temperature with a solid metal halide catalyst in the presence of about 1 to 10 volumes, preferably 2 to 5 volumes, of a lower haloalkane, such as ethyl chloride or methyl chloride, per volume of reactants. Suitable metal halide catalysts include aluminum chloride, aluminum bromide, stannous chloride, zirconium tetrachloride and the like. Generally the catalyst is dissolved in the same type of non-freezing, non-complex forming haloalkane solvent described above. The preferred catalyst solution is $AlCl_3$ dissolved in methyl chloride. The catalyst solution should contain a low concentration of catalyst, preferably below 0.01 weight percent, e.g. 0.001 to 0.01 weight percent. High purity isobutylene, i.e. at least 99% pure, is used, which preferably contains not more than 0.5% n-butenes and which is free of diisobutylene. Conversion is preferably held at a level below 70%, say at about 50 to 60%. This polymerization can conveniently be carried out in a commercial plant of the same type as is used for making butyl rubber.

The polyisobutylene recovered from this process has a fairly uniform molecular weight in the range of 180,000 to 350,000. A typical product is one having a Staudinger molecular weight of 250,000 to 300,000 and a tensile strength of 2,000 to 3,000. When polymers of this type are blended with other rubbers, e.g. natural, GR–S, isobutylene-isoprene butyl rubber, they form products that have superior abrasion resistance and elongation properties. For instance, 25 to 50 parts of polyisobutylene having a Staudinger molecular weight of 290,000 may be blended with 50 to 75 parts of GR–I–18 (isobutylene-isoprene butyl rubber), compounded, cured and used in a tire tread. Other applications include electrical wire coating, structural uses, etc. These polymers are especially suitable for coating electrical wires because they have such a low catalyst residue. This is an important factor because catalyst left in the polymer adversely affects the electrical properties of polyisobutylene.

The polyisobutylene may be compounded with pigments, such as titanium dioxide, dyes, etc., fillers such as carbon black and clay, plasticizing oils such as paraffinic hydrocarbon oils, etc.

The following example will serve to illustrate the present invention.

Example

Substantially pure isobutylene (99.2%) was polymerized by continuously contacting it with $AlCl_3$ dissolved in methyl chloride at $-100°$ C. The initial catalyst concentration was 0.01 weight percent and the initial conversion was 90 to 95%. It was found that this initial concentration is not necessary to initiate the reaction and that very low catalyst concentrations may be used throughout the operation. After the reaction began the catalyst concentration was reduced to 0.003 to 0.004 weight percent and the conversion was gradually reduced to 50 to 60%. Molecular weight samples were run on the polymer every hour and it was found that the molecular weight increased from about 74,000 to 206,000 in about four hours. By the end of the first day when conversions had reached 50 to 60%, polymer of 250,000+ molecular weight was being produced. The run was continued for four days and product having a molecular weight above 250,000 was produced at conversion levels of 50 to 60% and catalyst concentration of 0.003 to 0.004 weight percent. Of the entire four-day polymer production, 88% was over 250,000 molecular weight.

This is a continuation-in-part of U.S. patent application S.N. 539,015, filed October 6, 1955 and now U.S. Patent No. 2,779,753.

Resort may be had to various modifications and variations of the present invention without departing from the spirit of the discovery or the scope of the appended claims.

What is claimed is:

1. Process for preparing polyisobutylene having a Staudinger molecular weight of about 180,000 to 350,000 which comprises continuously polymerizing poison-free isobutylene at a temperature of between about $-100°$ and $-150°$ C. in the presence of an alkyl halide solution containing 1 to 2 carbon atoms and containing about 0.001 to 0.004 weight percent based on alkyl halide of an aluminum halide catalyst dissolved therein, and terminating the polymerization at a conversion level of between about 50% and 70%; said alkyl halide being a non-solvent for the high molecular weight polyisobutylene formed.

2. Process according to claim 1 in which the conversion level is maintained at 50 to 60%.

3. Process according to claim 1 in which the catalyst solution is aluminum chloride dissolved in methyl chloride.

4. Process for preparing polyisobutylene having a Staudinger molecular weight of about 250,000 to 350,000 which comprises continuously polymerizing poison-free substantially pure isobutylene at about $-100°$ C. to about $-150°$ C. in the presence of methyl chloride having dissolved in it about 0.003 to 0.004 weight percent based on methyl chloride of aluminum chloride and terminating the polymerization at a conversion level of about 50 to 60%; said methyl chloride being a non-solvent for the high molecular weight polyisobutylene formed.

5. Process for preparing high molecular weight polyisobutylene which comprises continuously polymerizing poison-free isobutylene in the presence of methyl chloride which is a non-solvent for the polyisobutylene formed, and having dissolved in it about 0.001 to 0.004 weight percent based on methyl chloride of aluminum trichloride at a temperature of about −100° to −150° C. and terminating the polymerization at a conversion level of between about 50% and 70% so that the resulting polyisobutylene has a Staudinger molecular weight of about 250,000 to 350,000.

References Cited in the file of this patent

UNITED STATES PATENTS

| | | |
|---|---|---|
| 2,395,079 | Sparks et al. | Feb. 19, 1946 |
| 2,474,571 | Brakeley et al. | June 28, 1949 |
| 2,474,671 | Hersberger | June 28, 1949 |
| 2,779,753 | Garabrant et al. | Jan. 29, 1957 |